United States Patent
Cotner et al.

(10) Patent No.: US 6,978,261 B2
(45) Date of Patent: *Dec. 20, 2005

(54) USING DATABASE MANAGEMENT SYSTEM'S INFRASTRUCTURE TO INVOKE A STORED PROCEDURE FOR CREATING AND PREPARING A DATABASE APPLICATION

(75) Inventors: Curt Lee Cotner, Gilroy, CA (US); Thomas Eng, San Jose, CA (US); Susan Malaika, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 264 days.

(21) Appl. No.: 09/363,780

(22) Filed: Jul. 29, 1999

(65) Prior Publication Data

US 2002/0059259 A1 May 16, 2002

(51) Int. Cl.[7] ............................................. G06F 17/30
(52) U.S. Cl. .............................. 707/2; 707/1; 707/100
(58) Field of Search .............................. 707/1–10, 104, 707/100–103, 104.1; 717/1–11, 100, 106–108, 122, 136–167

(56) References Cited

U.S. PATENT DOCUMENTS

| | | | |
|---|---|---|---|
| 5,230,049 A | * | 7/1993 | Chang et al. ................ 717/143 |
| 5,537,539 A | | 7/1996 | Narihiro |
| 5,553,234 A | | 9/1996 | Cotner et al. |
| 5,600,833 A | | 2/1997 | Senn et al. |
| 5,615,337 A | | 3/1997 | Zimowski et al. |
| 5,632,015 A | * | 5/1997 | Zimowski et al. .......... 395/200 |
| 5,657,447 A | | 8/1997 | Leung et al. |
| 5,675,804 A | * | 10/1997 | Sidik et al. ................. 395/705 |
| 5,689,633 A | | 11/1997 | Cotner et al. |
| 5,742,810 A | | 4/1998 | Ng et al. |

(Continued)

OTHER PUBLICATIONS

IBM Technical Disclosure Bulletin, "Providing a Protected Environment in a Server", vol. 40, No. 9, Sep. 1997, pp. 57–58.
IBM Technical Disclosure Bulletin, "FAST and Secure Stored Procedures for a Client/Server DBMS", vol. 38, No. 1, Jan. 1995, pp. 79–82.
C. Berg, "How Do I Access a SQL Database From an Applet", Dr. Dobb's Journal, vol. 22, No. 2, pp 103–105, 113–114, Feb. 1997 (ABSTRACT 1pp.).
K. North, "Using Interoperable SQL. One API–many Databases", Web Techniques, vol. 2, No. 7, pp 47–51, Jul. 1997 (Abstract 1pp.).

*Primary Examiner*—Jean M. Corrielus
*Assistant Examiner*—Joon Hwan Hwang
(74) *Attorney, Agent, or Firm*—Gates & Cooper LLP

(57) ABSTRACT

Using a database management system's own infrastructure to invoke a stored procedure for creating and preparing a database application. The stored procedure automates the pre-compile, compile, linker, and binder steps performed in creating and preparing the database application. The stored procedure is invoked to perform these steps in order to render the database application executable by the RDBMS. In conjunction with the invocation of the stored procedure, input parameters for the stored procedure may be specified including the requested function, the name of the database application, the source code for the database application, pre-compiler options, compiler options, linker options, binder options, and runtime options. The outputs from the stored procedure may include an executable load module, a database resource module, an output parameter string indicating the success or failure of each step, and one or more result sets containing the outputs of each step.

18 Claims, 3 Drawing Sheets

U.S. PATENT DOCUMENTS

| | | | | |
|---|---|---|---|---|
| 5,768,589 A | * | 6/1998 | Bradley et al. | 395/684 |
| 5,794,231 A | | 8/1998 | Li et al. | |
| 5,819,251 A | * | 10/1998 | Kremer et al. | 707/1 |
| 5,864,840 A | * | 1/1999 | Leung et al. | 707/2 |
| 5,875,332 A | * | 2/1999 | Wang et al. | 395/702 |
| 5,966,715 A | * | 10/1999 | Sweeney et al. | 707/203 |
| 6,006,235 A | * | 12/1999 | Macdonald et al. | 707/103 |
| 6,243,709 B1 | * | 6/2001 | Tung | 707/1 |

* cited by examiner

USING DATABASE MANAGEMENT SYSTEM'S INFRASTRUCTURE TO INVOKE A STORED PROCEDURE FOR CREATING AND PREPARING A DATABASE APPLICATION

BACKGROUND OF THE INVENTION

1. Field of the Invention

This invention relates in general to programming development environments, and in particular, to the use of a database management system's infrastructure to invoke a stored procedure for creating and preparing a database application.

2. Description of Related Art

Computer systems incorporating a Relational DataBase Management System (RDBMS) using a Structured Query Language (SQL) interface are well known in the art. The SQL interface has evolved into a standard language for an RDBMS and has been adopted as such by both the American National Standards Institute (ANSI) and the International Standards Organization (ISO).

Stored procedures are collections of pre-defined procedural programming statements that typically employ SQL to access relational databases managed by an RDBMS. Stored procedures for an RDBMS are not like procedures found in other high level languages. However, there are a number of benefits to using stored procedures in an RDBMS, including function encapsulation, performance improvements, client-server processing, and security.

Database applications often invoke stored procedures to handle some or all of their logic. However, a user first develops the database application in an interactive environment. This includes the steps of developing the source code, and then compiling, linking, and binding the source code to create the resulting executable modules. Unfortunately, these steps are often repetitive and time consuming. For example, the programmer has to develop a sequence of jobs to perform these various steps.

Thus, there is a need in the art for automated mechanisms for creating and preparing database applications. Moreover, there is a need in the art for techniques that use the RDBMS's own infrastructure to automate the preparation of database applications.

SUMMARY OF THE INVENTION

To overcome the limitations in the prior art described above, and to overcome other limitations that will become apparent upon reading and understanding the present specification, the present invention discloses a method, apparatus, and article of manufacture using a database management system's own infrastructure to invoke a stored procedure for creating and preparing a database application. The stored procedure automates the pre-compile, compile, linker, and binder steps performed in creating and preparing the database application. The stored procedure is invoked to perform these steps in order to render the database application executable by the RDBMS. In conjunction with the invocation of the stored procedure, input parameters for the stored procedure may be specified including the requested function, the name of the database application, the source code for the database application, pre-compiler options, compiler options, linker options, binder options, and runtime options. The outputs from the stored procedure may include an executable load module, a database resource module, an output parameter string indicating the success or failure of each step, and one or more result sets containing the outputs of each step.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention discloses a technique for using a RDBMS's own infrastructure to invoke a stored procedure for creating and preparing a database application. Specifically, the present invention discloses a stored procedure that automates the pre-compile, compile, linker, and binder steps performed in creating and preparing the database application. The stored procedure is invoked to perform these in order to render the database application executable by the RDBMS. In conjunction with the invocation of the stored procedure, input parameters for the stored procedure may be specified including the requested function, the name of the database application, the source code for the database application, pre-compiler options, compiler options, linker options, binder options, and runtime options. The outputs from the stored procedure may include an executable load module, a database resource module (DBRM), an output parameter string indicating the success or failure of each step, and one or more result sets containing the outputs of each step.

Hardware and Software Environment

Figure 1:
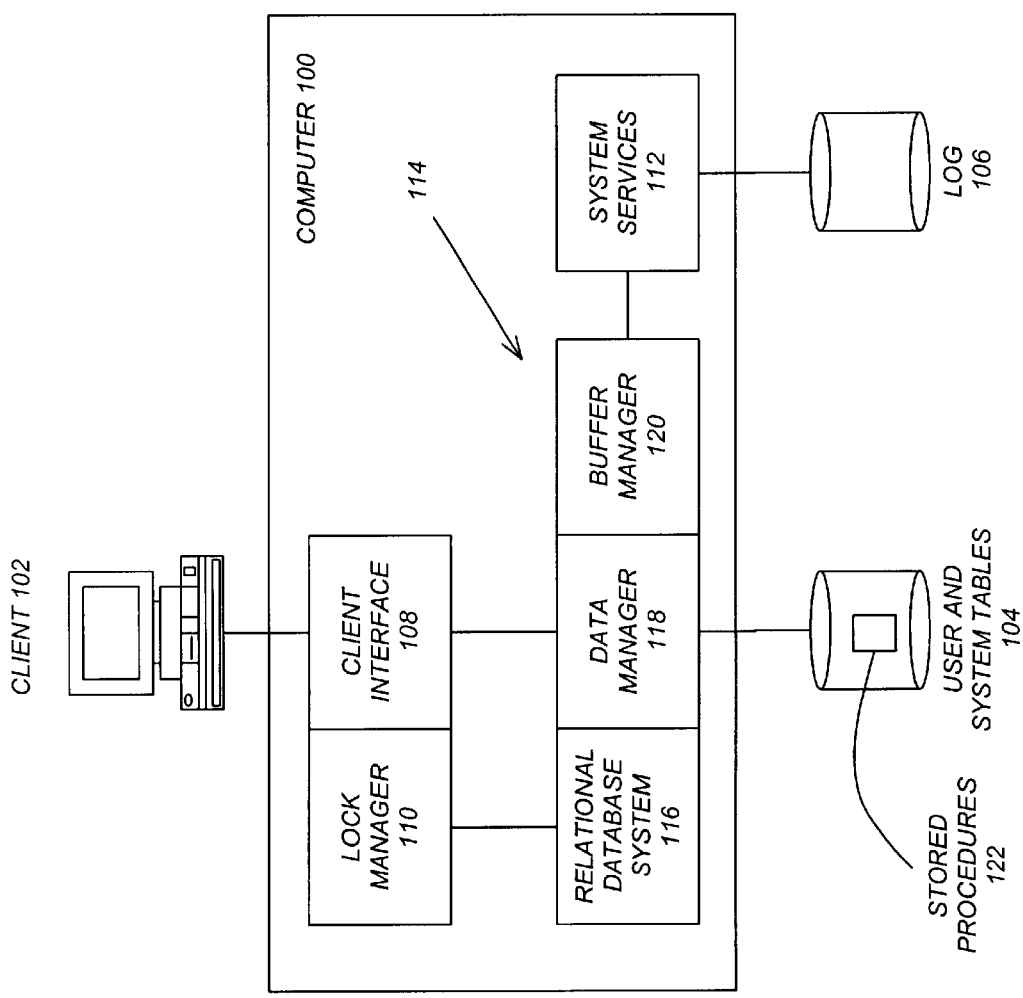
FIG. 1 illustrates an exemplary computer hardware environment that could be used with the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, and Buffer Manager 120, as well as other elements such as an SQL compiler/interpreter. These submodules support the functions of the SQL language, i.e., definition, access control, retrieval, and update of user and system tables 104.

The user and system tables 104 may include one or more stored procedures 122. These stored procedures 122 generally comprise pre-defined procedural programming statements that access the user and system tables 104 managed by the RDBMS.

Generally, the RDBMS comprises instructions and/or data that is embodied in or retrievable from a computer-readable device, medium, or carrier, e.g., a fixed or removable data storage device, a remote device coupled to the computer by a data communications device, etc. Moreover, these instructions and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions accessible from any computer-readable device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Database Services Module

Figure 2:
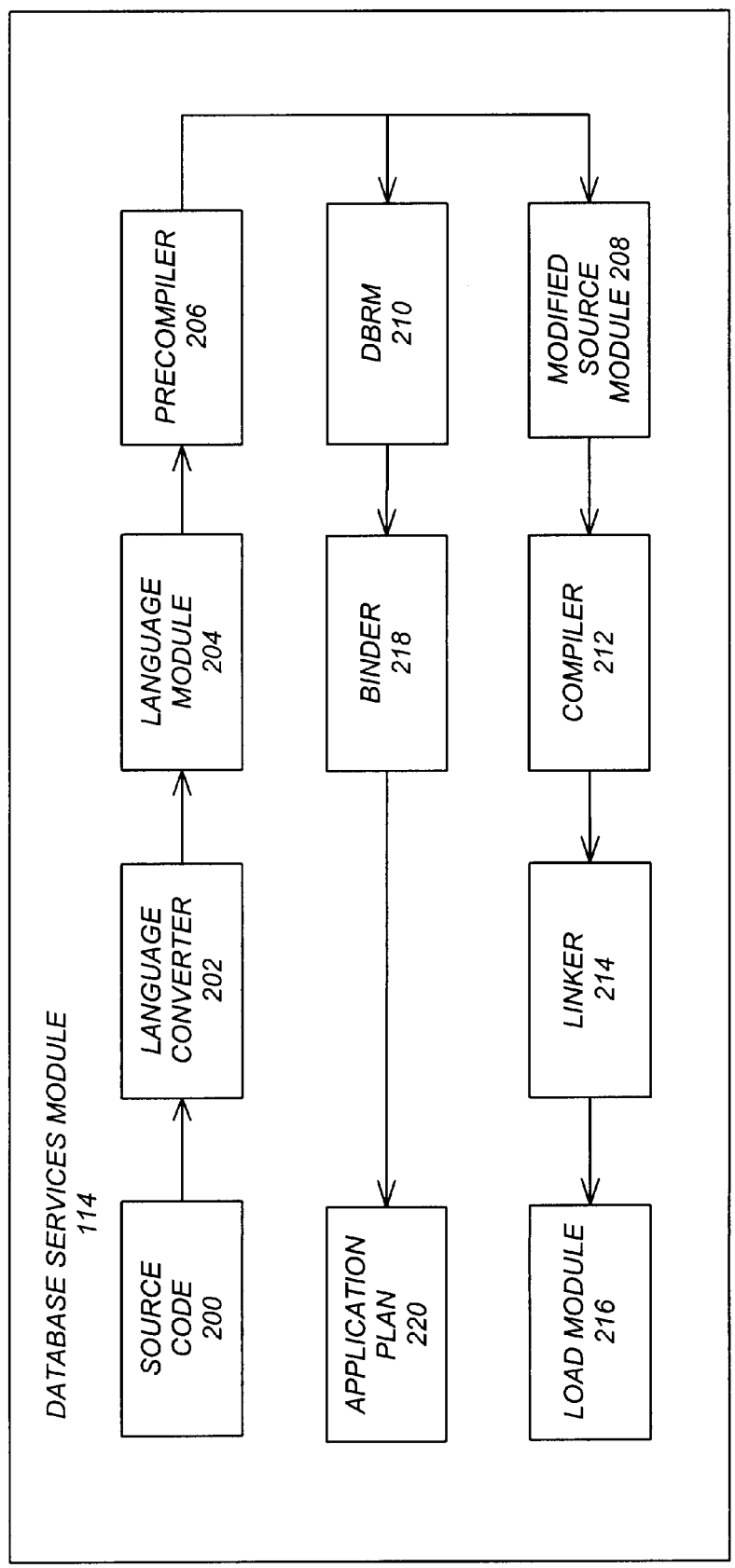
FIG. 2 is a block diagram further illustrating the components of the Database Services module necessary for the creation and preparation of database applications according to the preferred embodiment of the present invention.

FIG. 2 is a block diagram further illustrating the components of the Database Services module 114 necessary for the creation and preparation of database applications according to the preferred embodiment of the present invention. The database application comprises source code 200, that in the preferred embodiment may include C language statements, embedded SQL statements, embedded Data Definition Language (DDL) statements, and embedded Database Management Language (DML) statements. The source code 200 is then input to a C language converter 202 to create a C language module 204. The C language module 204 is input to a precompiler 206, which generates two outputs: a modified source module 208 and a Database Request Module (DBRM) 210. The modified source module 208 contains host language calls to the RDBMS, which the precompiler 206 inserts in place of SQL, DDL, and DML statements. The DBRM 210 is comprised of the SQL, DDL, and DML statements from the source code 200 that are invoked by the host language calls in the modified source module 208. A compiler 212 and linker 214 process the modified source module 208 to produce a load module 216, while a binder 218 processes the DBRM 210 to produce a compiled set of runtime structures for an application plan 220. Thereafter, the load module 216 and application plan 220 may be executed together immediately, or saved in the user and system tables 104 for later execution as a stored procedure 122.

Of course, those skilled in the art will recognize that all of the application processor steps mentioned above are specific to the implementation of the preferred embodiment, and alternative embodiments may use different application processor steps, without departing from the scope of the present invention. If the present invention were implemented on a different platform, e.g., UNIX, with a different RDBMS, e.g., ORACLE, using different build steps, e.g., without a C language converter or using a different language, it is intended that the present invention would cover such an implementation. This specification recites a specific implementation for illustration purposes only, and many changes may be made without departing from the scope of the present invention. Those skilled in the art will also recognize that different steps could be used without departing from the present invention, so long as similar functions are performed thereby.

Application Processor

Traditionally, each of the steps recited above in FIG. 2 are invoked manually by a programmer or invoked from a job developed by the programmer. For example, the programmer may place the source code 200 into a data set, and then run various jobs in order to invoke the converter 202, precompiler 206, compiler 212, linker 214, and binder 218. In the preferred embodiment, however, a stored procedure 122 stored in and maintained by the RDBMS can automate these steps. A stored procedure 122 used in this manner will henceforth be referred to as an "Application Processor" 122.

According to the preferred embodiment, the programmer would develop the source code 200 for a database application in the usual manner, and then interactively invoke the Application Processor 122 to perform the steps of FIG. 2 in order to render the database application executable. During the invocation of the Application Processor 122, a number of input parameters to the Application Processor 122 are specified, in order to customize its execution. As the various steps of FIG. 2 are performed using the source code 200, the Application Processor 122 stores any results or output (e.g., the DBRM 210, load module 216, application plan 220, etc.) into appropriate data sets. Moreover, the Application Processor 122 can produce messages, listings, and other output at each of the steps.

Using a stored procedure 122 to prepare a database application provides several advantages over preparing the database application manually:

- A database application that is prepared manually requires the programmer to develop the appropriate jobs to prepare the database application, whereas the Application Processor 122 is pre-programmed to prepare the source code.
- The Application Processor 122 can customize the preparation of the database application based on various input parameters.

The Application Processor 122 can manipulate the source code 200 of the database application if necessary. In the specific example described above, the Application Processor 122 invokes the C language converter 202 to translate the input source code 200 into another language.

Different Application Processors 122 can be developed for different environments, such as test or production environments.

Preparation of a database application can be performed from remote locations (i.e., in a distributed processing environment). Any user able to connect to a RDBMS and authorized to execute the Application Processor 122 can prepare the database application.

Restrictions can be placed on each Application Processor 122 as to who is authorized to prepare a database application in the particular environment.

The Application Processor 122 can gather and format outputs from each step into a more readable and usable form.

Logic of the Preferred Embodiments

Figure 3:
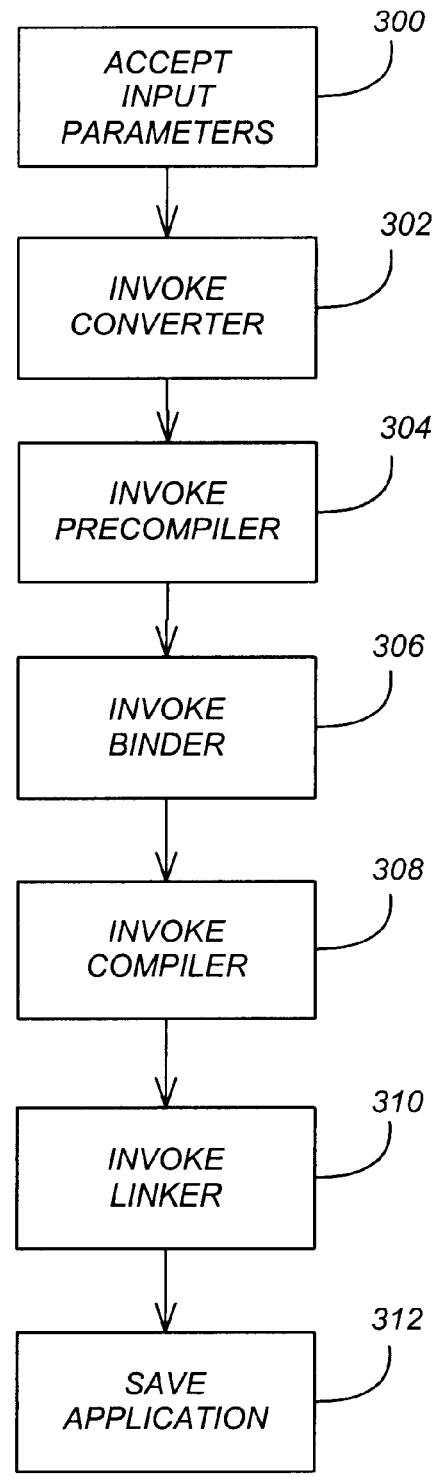
FIG. 3 is a flowchart illustrating the steps necessary for the creation and preparation of database applications according to the preferred embodiment of the present invention.

FIG. 3 is a flowchart illustrating the steps necessary for the creation and preparation of database applications according to the preferred embodiment of the present invention.

Block 300 represents the Application Processor 122 accepting the following input arguments: Function (e.g., "BUILD", "REBUILD", etc.), Database Application Name, Source Code, Bind Options, Compiler Options (e.g., "TEST/NOTEST", etc.), PreCompiler Options, Pre-Link Options, Linker Options, Runtime Options, Input File Dataset Name (used instead of Source Code parameter).

Block 302 represents the Application Processor 122 invoking the C language converter 202 to convert the source code 200 to a C language module 204.

Block 304 represents the Application Processor 122 invoking the precompiler 206 to process the C language module 204 to create the modified source module 208 and DBRM 210.

Block 306 represents the Application Processor 122 invoking the binder 218 to create the application plan 220 from the DBRM 210.

Block 308 represents the Application Processor invoking the compiler 212 to compile the modified source module 208 and Block 310 represents the Application Processor invoking the linker 214 to create load module 216.

Conclusion

This concludes the description of the preferred embodiment of the invention. The following describes some alternative embodiments for accomplishing the present invention. For example, any type of computer, such as a mainframe, minicomputer, or personal computer, could be used with the present invention. Alternative embodiments may encompass different components, different languages, different steps, or different sequences. In addition, any database management system, other than an RDBMS, could benefit from the present invention.

In summary, the present invention discloses a method, apparatus, and article of manufacture using a database management system's own infrastructure to invoke a stored procedure for creating and preparing a database application. The stored procedure automates the pre-compile, compile, linker, and binder steps performed in creating and preparing the database application. The stored procedure is invoked to perform these steps in order to render the database application executable by the RDBMS. In conjunction with the invocation of the stored procedure, input parameters for the stored procedure may be specified including the requested function, the name of the database application, the source code for the database application, pre-compiler options, compiler options, linker options, binder options, and runtime options. The outputs from the stored procedure may include an executable load module, a database resource module, an output parameter string indicating the success or failure of each step, and one or more result sets containing the outputs of each step.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for preparing a database application, comprising:

(a) a computer; and (b) a database management system, executed by the computer, for invoking a stored procedure to prepare the database application, wherein the invoked stored procedure invokes a precompiler to process the database application's source code to generate a modified source module and a database request module, the invoked stored procedure invokes a compiler and linker to process the modified source module to generate a load module, and the invoked stored procedure invokes a binder to process the database request module to generate an application plan, wherein the load module and the application plan are saved for execution as a stored procedure.

2. The apparatus of claim 1 above, wherein the source code comprises one or more statements selected from a group of statements including host language statements, embedded Structured Query Language (SQL) statements, embedded Data Definition Language (DDL) statements, and embedded Database Management Language (DML) statements.

3. The apparatus of claim 1 above, wherein the source code is input to a language converter to create a language module that is input to the precompiler.

4. The apparatus of claim 1 above, wherein the modified source module contains host language calls to the database management system, which the precompiler inserts in place of embedded Structured Query Language (SQL) statements, embedded Data Definition Language (DDL) statements, and embedded Database Management Language (DML) statements.

5. The apparatus of claim 1 above, wherein the database request module is comprised of the embedded Structured Query Language (SQL) statements, embedded Data Definition Language (DDL) statements, and embedded Database Management Language (DML) statements from the source code that are invoked by the host language calls in the modified source module.

6. The apparatus of claim 1 above, wherein the stored procedure accepts one or more input parameters comprising a function identifier, a name of the database application, the source code, one or more precompiler options, one or more compiler options, one or more pre-link options, one or more linker options, one or more binder options, one or more runtime options, and an input file dataset name.

7. A method for preparing a database application in a computer, comprising:
(a) invoking a stored procedure in a database management system executed by the computer to prepare the database application, wherein the invoked stored procedure invokes a precompiler to process the database application's source code to generate a modified source module and a database request module, the invoked stored procedure invokes a compiler and linker to process the modified source module to generate a load module, and the invoked stored procedure invokes a binder to process the database request module to generate an application plan, wherein the load module and the application plan are saved for execution as stored procedure.

8. The method of claim 7 above, wherein the source code comprises one or more statements selected from a group of statements including host language statements, embedded Structured Query Language (SQL) statements, embedded Data Definition Language (DDL) statements, and embedded Database Management Language (DML) statements.

9. The method of claim 7 above, wherein the source code is input to a language converter to create a language module that is input to the precompiler.

10. The method of claim 7 above, wherein the modified source module contains host language calls to the database management system, which the precompiler inserts in place of embedded Structured Query Language (SQL) statements, embedded Data Definition Language (DDL) statements, and embedded Database Management Language (DML) statements.

11. The method of claim 7 above, wherein the database request module is comprised of the embedded Structured Query Language (SQL) statements, embedded Data Definition Language (DDL) statements, and embedded Database Management Language (DML) statements from the source code that are invoked by the host language calls in the modified source module.

12. The method of claim 7 above, wherein the stored procedure accepts one or more input parameters comprising a function identifier, a name of the database application, the source code, one or more precompiler options, one or more compiler options, one or more pre-link options, one or more linker options, one or more binder options, one or more runtime options, and an input file dataset name.

13. An article of manufacture embodying logic for performing a method for preparing a database application in a computer, the method comprising:
(a) invoking a stored procedure in a database management system executed by the computer to prepare the database application, wherein the invoked stored procedure invokes a precompiler to process the database application's source code to generate a modified source module and a database request module, the invoked stored procedure invokes a compiler and linker to process the modified source module to generate a load module, and the invoked stored procedure invokes a binder to process the database request module to generate an application plan, wherein the load module and the application plan are saved for execution as a stored procedure.

14. The method of claim 13 above, wherein the source code comprises one or more statements selected from a group of statements including host language statements, embedded Structured Query Language (SQL) statements, embedded Data Definition Language (DDL) statements, and embedded Database Management Language (DML) statements.

15. The method of claim 13 above, wherein the source code is input to a language converter to create a language module that is input to the precompiler.

16. The method of claim 13 above, wherein the modified source module contains host language calls to the database management system, which the precompiler inserts in place of embedded Structured Query Language (SQL) statements, embedded Data Definition Language (DDL) statements, and embedded Database Management Language (DML) statements.

17. The method of claim 13 above, wherein the database request module is comprised of the embedded Structured Query Language (SQL) statements, embedded Data Definition Language (DDL) statements, and embedded Database Management Language (DML) statements from the source code that are invoked by the host language calls in the modified source module.

18. The method of claim 13 above, wherein the stored procedure accepts one or more input parameters comprising a function identifier, a name of the database application, the source code, one or more precompiler options, one or more compiler options, one or more pre-link options, one or more linker options, one or more binder options, one or more runtime options, and an input file dataset name.

* * * * *